United States Patent [19]

Laurello

[11] Patent Number: 4,815,272

[45] Date of Patent: Mar. 28, 1989

[54] TURBINE COOLING AND THERMAL CONTROL

[75] Inventor: Vincent P. Laurello, Guilford, Conn.

[73] Assignee: United Technologies Corporation, Hartford, Conn.

[21] Appl. No.: 46,069

[22] Filed: May 5, 1987

[51] Int. Cl.[4] .............................................. F02C 7/18
[52] U.S. Cl. ................................. 60/39.75; 60/39.83; 415/115; 415/175; 415/180
[58] Field of Search ................... 60/39.83, 39.07, 726, 60/39.75, 262, 266; 415/115, 116, 117, 175, 177, 178, 180, 170 R

[56] References Cited

U.S. PATENT DOCUMENTS

| | | | |
|---|---|---|---|
| 3,452,542 | 7/1969 | Saferstein et al. | 415/115 |
| 3,742,706 | 7/1973 | Klompas | 415/115 |
| 3,844,110 | 10/1974 | Widlansky et al. | 60/726 |
| 3,945,758 | 3/1976 | Lee | 415/115 |
| 3,975,901 | 8/1976 | Hallinger et al. | 415/115 |
| 4,217,755 | 8/1980 | Williams | 415/115 |
| 4,296,599 | 10/1981 | Adamson | 60/39.23 |
| 4,425,079 | 1/1984 | Speak et al. | 415/115 |
| 4,462,204 | 7/1984 | Hull | 60/39.07 |
| 4,513,567 | 4/1985 | Deveau et al. | 60/39.02 |
| 4,574,584 | 3/1986 | Hovan | 60/39.07 |
| 4,576,547 | 3/1986 | Weiner et al. | 60/726 |
| 4,653,267 | 3/1987 | Brodell et al. | 60/39.07 |

Primary Examiner—Donald E. Stout
Attorney, Agent, or Firm—Edward L. Kochey, Jr.

[57] ABSTRACT

A coolant system uses a first quantity of high temperature air at cruise power and a second larger quantity of cooler air at high power. Relatively high rotating clearances are achieved at high power and low clearance achieved at cruise power.

2 Claims, 1 Drawing Sheet

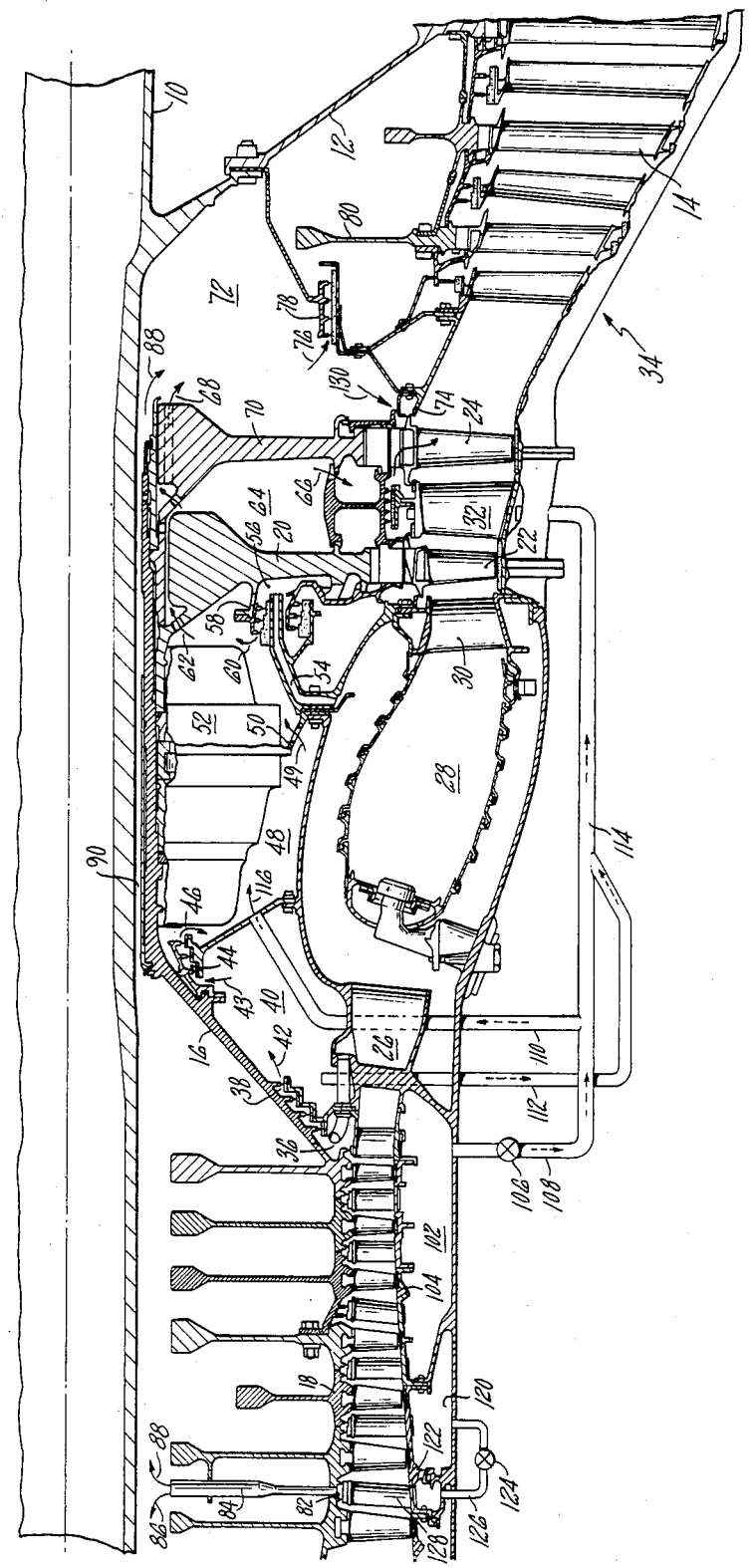

TURBINE COOLING AND THERMAL CONTROL

TECHNICAL FIELD

The invention relates to modulation of cooling airflow in a gas turbine engine and in particular to a modification in turbine blade clearances during high and low power conditions.

In order to obtain maximum efficiency from a gas turbine engine the turbine components are pushed to the maximum temperature limits. In order to permit the materials to survive and/or permit the use of less exotic materials it is conventional to cool those components most severely exposed to the hot gases of the main flow. Such cooling flow bypasses a portion of the turbine and accordingly decreases the operating efficiency of the gas turbine engine. Higher temperatures exist during high power operation than during normal low power operation. It is according known to increase the quantity of airflow during the high power requirements to increase the cooling while decreasing the quantity at low power requirements when such high cooling quantity is not required.

The rotating rotor of the turbine must have some clearance with respect to the stator. During low power operation it is desirable that this clearance be minimized to minimize bypassing of gases which would decrease the efficiency of the turbine. During high power operation often associated with acceleration of the rotor and acceleration of the aircraft carrying the engine, distortion because of the high takeoff thrust loads, gyroscopic loads, and temperature transients suggest an increased clearance at this time.

Prior art systems have focused on the cooling approach and not given adequate consideration to expansion and contraction of the rotor as it affects these clearances.

DISCLOSURE OF THE INVENTION

It is an object of the invention to minimize the cooling air requirements and to simultaneously with the cooling of the high temperature components affect the temperature of the bore of the turbine in such a manner as to improve the clearance in accordance with the requirements at low and high power.

The coolant flow path at low power requirements (such as cruise) takes cooling air from substantially the compressor discharge passing it through labyrinth seals in contact with the high pressure turbine rotor disks. A portion of this high temperature air continues in contact with low temperature rotor bore, with both cooling airflow ultimately cooling the high temperature components. The use of the high temperature air causes the bore of the rotors to expand thereby minimizing clearances.

For high power operation (such as takeoff) the increase in cooling airflow is taken from a lower temperature source which is located at a lower stage in the compressor. This cooler airflow mixes with the high temperature airflow producing not only a higher flow quantity but a lower temperature than would conventionally exist. This lower temperature cools airflow the bore of both the high pressure and low pressure turbines more than the high temperature air existing at the low power condition. Accordingly, the turbines are shrunk and increased clearance exists at this high power condition.

A portion of the high temperature air leaking through the labyrinth seal by the compressor discharge may be discharged to a sink, decreasing the flow passed on, and thereby increasing the effectiveness of the cooling caused by introduction of the lower temperature air.

The cooling of the low temperature rotor during high power conditions may be further increased by using air from a still lower stage of the compressor and introducing this still lower temperature air immediately upstream of the seals to the low pressure turbine bore.

The use of only the high temperature air during normal low power operation results in minimum clearances and accordingly maximum efficiency for long term operation.

BRIEF DESCRIPTION OF THE DRAWING

The FIGURE is a sectional view through the central portion of a gas turbine engine showing a compressor, a high pressure turbine and a low pressure turbine along with the cooling flow path.

BEST MODE FOR CARRYING OUT THE INVENTION

A first shaft 10 carries the low pressure turbine bore 12 which in turn carries a plurality of low pressure turbine blades 14. A second concentric shaft 16 carries the rotor of the compressor 18 and the disks 20 of the high pressure turbine which in turn carry the high pressure turbine first stage blades 22 and second stage blades 24.

Air compressed by compressor 18 passes through diffuse 26 entering combustion chamber 28 in which fuel is burned. Hot gases forming the main flow pass from the combustion chamber through first stage vanes 30, blades 22, second stage vanes 32, and second stage blades 24 passing to the low pressure turbine 34. The high temperature vanes and blades require cooling as do the seals in this high temperature area of the turbine.

During low power operation a high temperature coolant flow path is established to cool these various components. A high pressure compressor outlet plenum 36 contains air at full pressure and at a temperature of about 1000 F. Airflow leaking through labyrinth seals 38 passes into high pressure plenum 40. In passing through the seals this air is further heated to a temperature of about 1100 F. Arrow 42 shows this airflow from the high pressure plenum 40. Air flows 43 through labyrinth seals 44 continuing 46 into mixing plenum 48. This flow passes 49 through generous openings in the support structure 50 for the bearing case 52.

Cooling air for the first stage blade 22 is supplied through a tangential on-board nozzle 54 passing through plenum 56. A portion of this air leaks through labyrinth seal 58 with this leakage flow 60 joining flow 49 through the flow path. This flow passes through the disk 20 of the high pressure turbine into a plenum 64 with a portion of the airflow 66 cooling the second stage blades 24 and associated seals. The remainder of the flow passes 68 through another turbine disk 70 into the intermediate pressure chamber 72. This air in passing in contact with the disks 20 and 70 heats the disks thereby establishing the amount of expansion of the rotor and since a high temperature is used results in minimum clearances between the blades and the stator as well as between the vanes and the rotor.

A loose seal in the form of a C-seal 74 permits leakage from intermediate pressure plenum 72 into the main flow and being a loose seal essentially pegs the pressure in intermediate pressure plenum 72 to the pressure existing at that location in the main gas flow.

A portion of the cooling airflow 76 passes through labyrinth seals 78 into the area of the bore 80 of the low pressure turbine. It passes outwardly from this chamber into the main gas stream through various openings and clearances.

Labyrinth seals 82 in a low stage portion of the compressor permits leakage to pass through anti-vortex tube 84 with a portion of this flow 86 passing through a compressor rotor seal. A second portion of this flow 88 passes through clearance 90 between the rotor shafts entering the intermediate pressure chamber 72. For high power operation an increased quantity of lower temperature air is used to cool the components. Plenum 102 receives lower temperature air from bleed point 104, this air temperature being in the order of 800 F. Valve 106 is opened during high power operation to permit this lower temperature air to flow through conduit 108 and 110 to the mixing chamber 48. This air mixing with the high temperature air 46 entering the plenum produces a lower temperature and higher quantity air 49 passing through the remainder of the cooling circuit as described previously.

Vent line 112 permits a portion of the hot air from plenum 40 to be discharged through line 114 to the area of the second stage vanes. This hot air may be vented to alternate sinks, its primary purpose being to reduce the flow 43 as compared to the flow 42 thereby resulting in a lower flow 46 of the hot air to be mixed with the cooler airflow 116.

It can be seen that during high power operation opening of the valve 106 also supplies additional coolant through line 114 to the second stage vane. As illustrated here, line 112 venting the high pressure chamber 40 is opened at all times permitting flow to cool the second stage vane. Depending on the cooling requirements at the various levels of operation, this line may be left open or valved to operate only when the cooling 116 is introduced into the mixing chamber 48.

It is possible to further reduce the temperature of air passing into the intermediate pressure plenum 72 during high power operations by increasing the airflow from the low stages of the compressor. The lower stage plenum 120 receives bleed air through line 122. Valve 124 may be opened to permit flow through line 126 passing through vane 128 joining the leakage flow passing through antivortex tube 84. This results in an increased flow of cooler air 88 passing into the intermediate pressure plenum 72. This further reduces the temperature of the air 76 passing into the low pressure turbine bore 80.

When the additional quantity of low temperature cooling air is imposed by opening valve 106 the increased flow through the high pressure turbine disks at 62 and 68 result in a increased pressure existing throughout the flow path. This results in a slightly reduced leakage through the labyrinth seals and accordingly a further reduction in mixing of the hot air. It also results in an increased pressure in chamber 64 which produces an increasing flow 68 to cool the second stage blades 24.

Since this cooling flow is in intimate contact with the bore or rotor disks 20 and 70 of the high pressure turbine, it results in a relatively high temperature bore during low power conditions compared to a low temperature bore at high power conditions. This affects the expansion and accordingly results in an increased clearance at high power and a reduced clearance at low power.

At high power conditions the temperature existing in the main gas stream is such that these high temperature gases would not be desirable within intermediate pressure plenum 72. Accordingly, a high airflow 130 exists through C-seal 74 to prevent ingestion of the hot gas into the plenum. Because of the loose clearance of seal 74 this does not result in any substantial change of leakage 76 passing into the low pressure turbine bore. While the high flow of coolant does not affect the flow into the low pressure turbine, the decrease in temperature of this coolant results in cooling of the disks 80 of the low pressure turbine, thereby increasing the clearance during the high power condition.

At low power condition the flow 130 is reduced to only a nominal flow through the C-seal 74. At this time ingestion of gases through the seal into the plenum 72 can be expected with this resulting in a still further increased temperature in the plenum. This results in an increased temperature in the flow 76 passing to the low pressure turbine and accordingly increasing the temperature of the disks 80. This reduces the clearance of the turbine at this low power condition thereby increasing the efficiency of the gas turbine engine.

The use of low temperature air from the lower compressor stages reduces the quantity needed, and also reduces the power required to compress it. Using the cooling method described increases the temperature of the high pressure turbine bore by about 65 F. at low power, as compared to high power. It will increase the relative temperature by 50 F. in the low pressure turbine bore if no ingestion occurs, and by even more if ingestion occurs.

I claim:

1. In a gas turbine system having a multi-stage compressor, a turbine having a turbine stator, and a turbine rotor having a bore;
   a coolant path in contact with said bore including a high pressure plenum, labyrinth seal means for restrictively supplying high temperature air from substantially the compressor outlet to said high pressure plenum, a mixing plenum, labyrinth seal means for restrictively passing air from said high pressure plenum to said mixing plenum, means for conveying air from said mixing plenum in contact with said bore and thereafter discharging the air into the main gas flow;
   means for passing low temperature air from a low stage of said compressor to said mixing plenum;
   the improvement comprising:
   said means for passing low temperature air comprising means for directly conveying low temperature air to said mixing plenum;
   valve means for stopping and modulating said low temperature airflow;
   said turbine comprised of a high pressure turbine, and a low pressure turbine having a low pressure turbine bore;
   said compressor having a bore;
   an intermediate pressure plenum located to receive air from said mixing plenum after contact with said turbine bore;
   conveying means for conveying air from said compressor in contact with said compressor bore to said intermediate pressure plenum;

labyrinth seals restricting flow from said intermediate pressure plenum to said low pressure turbine bore; and loose seals restricting flow from said intermediate pressure plenum to the main flow path whereby a high flow of said low temperature air will increase air flow through said loose air seal, deterring hot gas ingestion into said intermediate pressure chamber.

2. An apparatus as in claim 1 further comprising:

venting means for discharging a portion of air from said high pressure plenum to a sink, whereby a reduced portion of the air passing through said first labyrinth seal passes through said second labyrinth seal into said mixing plenum.

* * * * *